United States Patent [19]

Gugala et al.

[11] Patent Number: 5,577,709
[45] Date of Patent: Nov. 26, 1996

[54] STEM SEAL CONFIGURATION FOR BALL VALVES

[75] Inventors: Zbigniew H. Gugala, Spring Grove; Lawrence J. Loman, Oak Lawn; John N. Scapes, Schaumburg, all of Ill.

[73] Assignee: Henry Valve Company, Melrose Park, Ill.

[21] Appl. No.: 544,124

[22] Filed: Oct. 17, 1995

[51] Int. Cl.[6] .................................................. F16K 5/06
[52] U.S. Cl. ..................... 251/315.14; 251/214; 251/288
[58] Field of Search ................................... 251/214, 288, 251/315.14

[56]  References Cited

U.S. PATENT DOCUMENTS

| | | |
|---|---|---|
| 2,963,304 | 12/1960 | Comlossy, Jr. et al. . |
| 4,203,460 | 5/1980 | Priese . |
| 4,475,712 | 10/1984 | Dejager . |
| 4,479,513 | 10/1984 | Koch et al. . |
| 4,538,790 | 9/1985 | Williams et al. . |
| 4,558,874 | 12/1985 | Williams et al. . |
| 4,572,239 | 2/1986 | Koch et al. . |
| 4,640,305 | 2/1987 | Johnson . |
| 4,762,301 | 8/1988 | Wozniak et al. ............... 251/214 X |
| 4,773,442 | 9/1988 | Lephilibert . |
| 5,037,065 | 8/1991 | Hirz et al. ........................ 251/214 |
| 5,046,703 | 9/1991 | Kamiyama et al. . |
| 5,056,758 | 10/1991 | Bramblet . |
| 5,131,666 | 7/1992 | Hutchens . |
| 5,269,339 | 12/1993 | Szatmary . |
| 5,284,319 | 2/1994 | Baumann . |
| 5,299,812 | 4/1994 | Brestel et al. . |
| 5,397,100 | 3/1995 | Miller . |

*Primary Examiner*—John Fox
*Attorney, Agent, or Firm*—Lockwood, Alex, Fitzgibbon & Cummings

[57]  ABSTRACT

When the O-rings of ball valves used in the fluid circuits of refrigeration systems are exposed to new EPA-correct refrigerants and blends, the lubrication covering the O-rings tends to wash away. This results in failure of the ball valves. A quarter turn ball valve with a valve stem seal configuration for use under such conditions is disclosed. The valve stem seal configuration protects the ball valve O-ring from contact with the refrigerant fluid flowing through the ball valve. The ball valve has a valve stem receiving passageway with annular recesses in the upper and bottom portions of the passageway. The recesses are spaced apart from one another and a primary seal washer is seated within the bottom recess while an O-ring is seated within the upper recess. Both embrace the valve stem. An annular spring and valve stem guide are supported above the O-ring. In order to minimize wear, the O-ring is maintained in a state of "controlled squeeze" where it is subjected only to radial compression. The stem guide limits the rotation of the valve stem between the open and closed positions. The annular spring means maintains an upward thrust on the valve stem so that a flange on the bottom of the valve stem compresses the primary seal washer against the top of the bottom recess and the radial portion of the recess so as to form a seal.

7 Claims, 2 Drawing Sheets

STEM SEAL CONFIGURATION FOR BALL VALVES

BACKGROUND AND DESCRIPTION OF THE INVENTION

1. Field of the Invention

The present invention relates generally to valves for use in fluid circuits of refrigeration systems and, more particularly, to a valve stem seal assembly or configuration that protects a quarter turn ball valve's O-ring seal from exposure to refrigerant.

2. Discussion

Quarter turn ball valves are commonly used in refrigeration circuits to direct the flow of refrigerant through the circuits or to retain the charge of refrigerant in the circuits while isolating a portion of the circuit to facilitate the repair and/or replacement of system components or to perform general system maintenance. A key component of quarter turn ball valves is the valve stem packing and seal assembly or configuration. The purposes of the valve stem seal configuration is to seal the passage through which the rotatable valve stem passes through the valve body and to provide a bearing for resisting the internal pressure load acting on the valve stem. Many existing ball valve designs use an O-ring seal as the primary valve stem seal. The O-ring is lubricated prior to assembly of the valve and facilitates turning of the valve stem between the open and closed positions. Use of the O-ring as the primary seal typically exposes it to the flow of refrigerant through the valve.

Refrigerants such as R22 and R502 have been the standard refrigerants used in the refrigeration and air-conditioning industry for many years. Use of these refrigerants, however, have been found to pose a threat to the ozone in the atmosphere and the Environmental Protection Agency (EPA) has mandated that they be phased out of use. As a result, the refrigeration industry has been experimenting with new, ozone compatible refrigerants. When exposed to the standard refrigerants of the past (R22 and R502), O-rings have maintained their lubrication capability. Exposure to the new EPA-correct refrigerants and blends, however, has dried out the O-rings. That is, the new refrigerants and blends tend to wash away the lubricants on the O-rings. As a result, lubrication of the O-rings has not been maintained and it is believed that the exposure of the O-rings to the refrigerant may be destructive to the O-ring material itself which could cause leakage of the refrigerant through the O-rings.

It is, therefore, an object of the present invention to provide a valve stem seal configuration for quarter turn ball valves that isolates and protects the seal O-rings from contact with refrigerants flowing through the valve.

Another object of the invention is to protect the O-rings from axial forces that can cause them to wear prematurely.

SUMMARY OF THE INVENTION

The present invention is directed to an improved ball valve for use in fluid refrigeration circuits. The ball valve of the present invention provides a valve stem seal configuration that isolates and protects its O-ring from contact with refrigerant flowing through the valve. The valve stem receiving passageway in the valve body has a bottom annular recess as well as a multi-section upper annular recess spaced above it. A primary seal washer is seated in the bottom annular recess while a secondary seal washer and an O-ring above it are seated within the lower section of the upper recess. All three embrace the valve stem. An annular spring means and gland, also embracing the valve stem, are supported in the valve stem passageway above the O-ring so as not to compress it. As a result, the O-ring is maintained in a state of "controlled squeeze" wherein it is subjected only to radial compression. The secondary seal washer acts as a barrier due to interference fits and also acts as an O-ring backer. The gland serves as a valve stem guide that provides stops that limit the opening and closing of the valve stem. The spring and gland are held in place by a retainer and, as a result, maintain an upward thrust on the valve stem so that a flange on the bottom of the valve stem compresses the primary seal washer against the top of the bottom recess and the radial wall of the recess so as to prevent leakage of refrigerant into the valve stem receiving passage. This prevents the refrigerant from migrating into the upper recess holding the O-ring.

For a more complete understanding of the nature and scope of the invention, reference may now be had to the following detailed description of embodiments thereof taken in conjunction with the appended claims and accompanying drawings.

DESCRIPTION OF THE PREFERRED EMBODIMENTS

Figure 1:
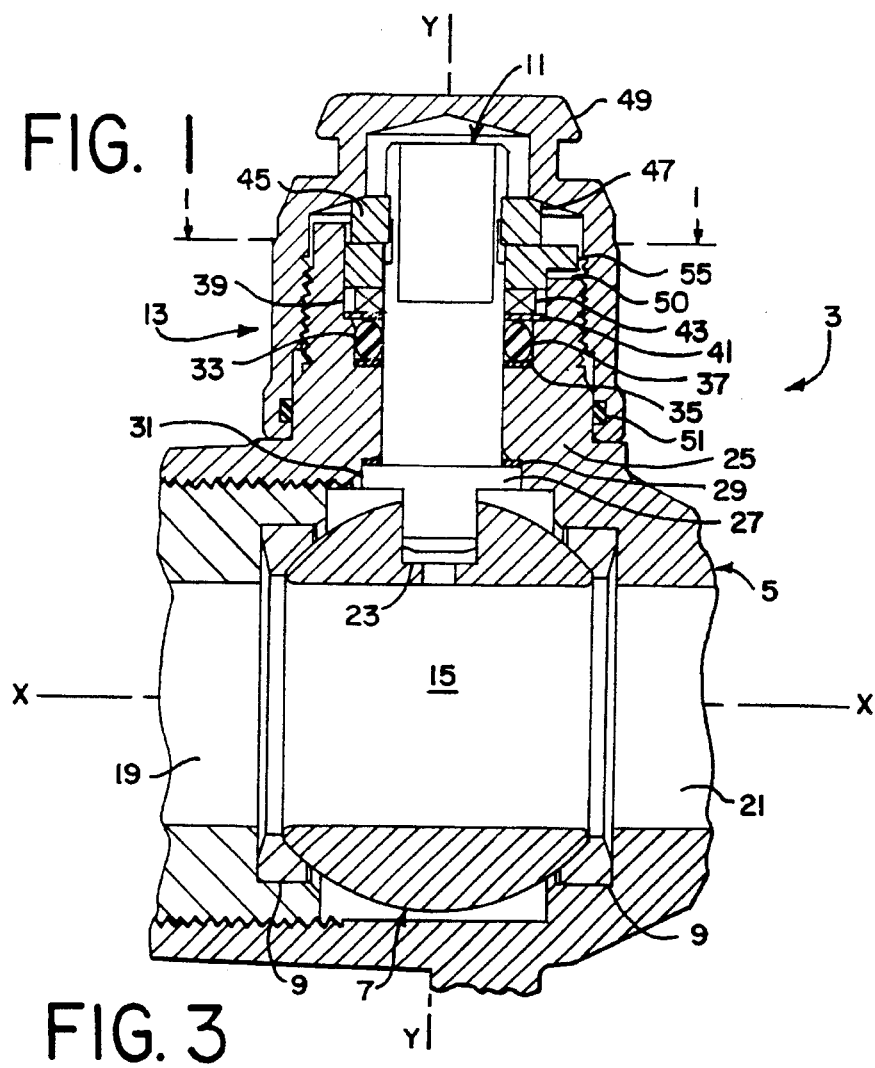
FIG. 1 is a vertical cross-sectional view of a quarter turn ball valve in the open position incorporating a preferred embodiment of the valve stem seal configuration of the invention using a lock nut as the retainer.

A quarter turn ball valve incorporating the valve stem seal configuration of the invention is indicated generally at 3 in FIG. 1. Valve 3 incorporates a valve body indicated generally at 5. The valve body 5 includes a ball valve member receiving portion and a valve stem receiving portion. Contained within the ball valve member receiving portion of body 5 is a ball valve member 7 and ball seals 9. Contained within the valve stem receiving portion is a valve stem 11 and the valve stem packing or seal configuration indicated generally at 13.

The ball valve member 7 is rotatable about an axis Y-Y, and includes a fluid passage 15 therethrough to communicate with fluid line input and output ports 19 and 21 when in the open position as shown in FIG. 1. Fluid flows through the passage in a direction parallel to axis X-X when the ball valve member is in the open position. Alternatively, as is well understood, a quarter turn rotation of ball valve member 7 places it in the closed position which prevents communication and thus the flow of fluid between the fluid line inlet and outlet ports 19 and 21. Fluid passage 15 in the ball valve member 7 is sized substantially equal to the size of the fluid lines that the valve 3 is designed to service. Ball seals 9 made of Teflon or other suitable materials prevent the leakage of fluid around ball member 7. Valve stem 11 engages slot 23 in ball member 7 for rotating ball member 7 as valve stem 11 is rotated about axis Y-Y.

Valve stem 11 is operable to rotate ball member 7 through ninety degrees (90°) of rotation between open and closed positions. Valve stem 11 extends along axis Y-Y and is rotatably supported and journaled in the lower collar portion 25 of the valve stem receiving portion of the body 5. The bottom end of valve stem 11 is shaped to engage slot 23 in ball valve member 7 and also has a flange 27. The top portion of valve stem 11 extends beyond valve stem seal configuration 13 and valve body 5 and is shaped to permit engagement with a tool used to rotate valve stem 11. The top portion of valve stem 11 is also threaded so as to allow attachment of a lock nut.

The valve stem seal configuration, indicated generally at 13, is located in annular recesses in the valve body 5 surrounding valve stem 11. A primary seal washer 29 made of Teflon or other suitable material resistant to fluid passage through the valve 3 is seated in the upper end of bottom annular recess 31, located beneath collar portion 25. Seated in annular recess 33, located above collar portion 25, is a backup ring 35 made of Teflon, Nylon or other suitable material. The backup ring 35 preferably has an interference fit both on its inner circumference with valve stem 11 and its outer circumference with the side wall of the annular recess 33 and thus serves to prevent the passage of fluid should the primary seal washer 29 fail. Located above backup ring 35 is O-ring 37. O-ring 37 also has an interference fit with valve stem 11 and the side wall of annular recess 33. Located above annular recess 33 is a larger diameter annular recess 39. Resting on the shoulder formed between annular recess 33 and the larger diameter annular recess 39 is a washer 41. A wave spring shown diagrammatically at 43 is sandwiched between washer 41 and a gland 45 which serves as a stem guide. The washer 41 supports the wave spring 43. This arrangement allows the O-ring 37 to be maintained in a state of "controlled squeeze" where it is subjected only to radial compression. A lock nut 47 is threaded on the upper portion of valve stem 11 above the stem guide 45 and compresses the wave spring 43 between the stem guide 45 and the washer 47. This compression causes an upward thrust to be exerted on valve stem 11 which causes valve stem flange 27 to compress primary seal washer 29 against the upper end of bottom annular recess 31 and the radial wall of recess 31 so as to form a seal therewith.

Cap 49 screws onto the top portion of valve body 5 to protect the exposed portions of valve stem 11 and valve stem seal configuration 13. Cap seal 51 prevents the entry of contaminants into cap 49. Cap seal 51 is designed to act as a primary pressure vent in the event that system overpressures need to be relieved. By rotating cap seal 51 beyond the containment surface on valve body 5, cap seal 51 disengages prior to cap 49 thread disengagement.

Figure 2:
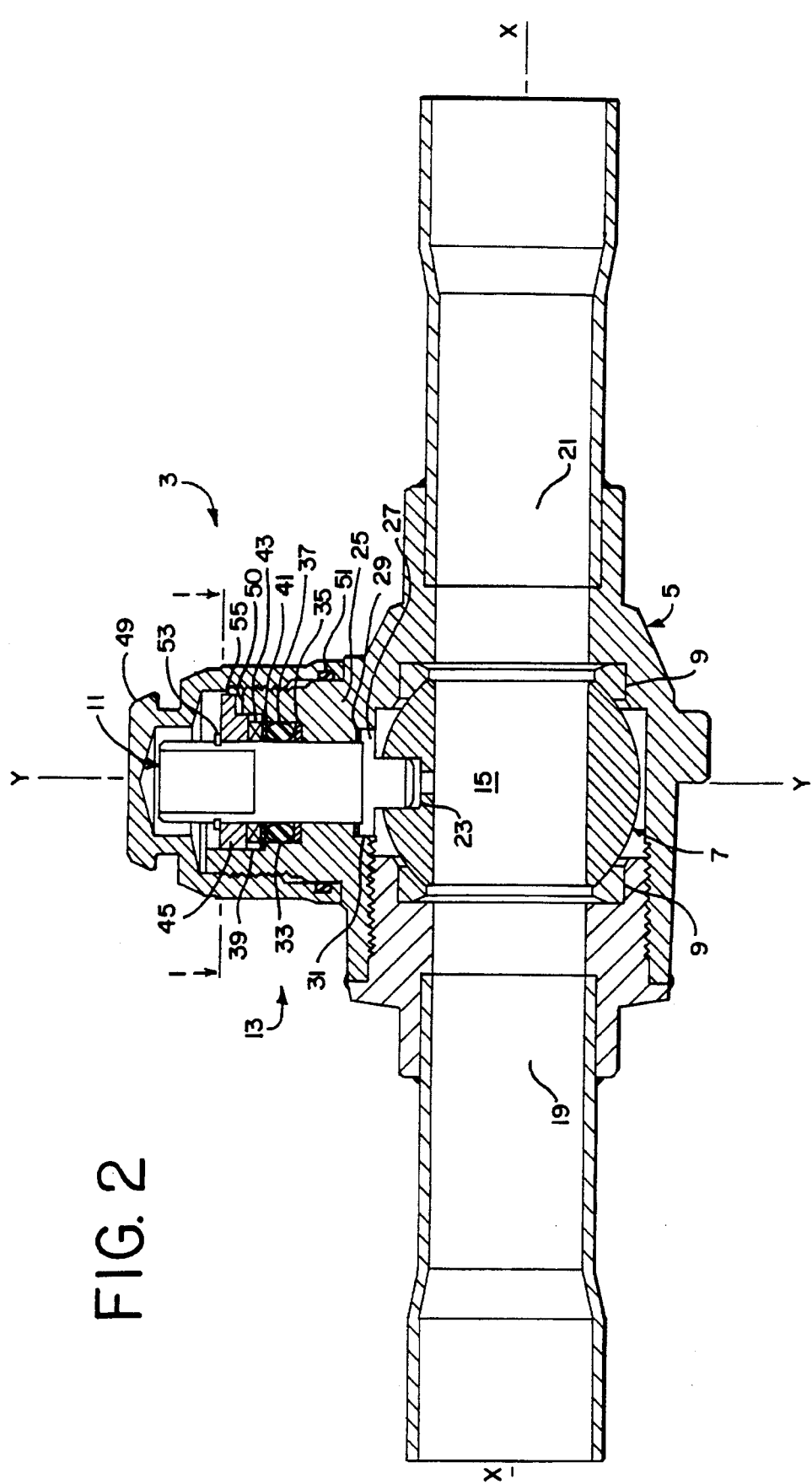
FIG. 2 is a vertical cross-sectional view of the valve of FIG. 1 wherein a snap washer has been substituted for the lock nut as the retainer.

FIG. 2 shows an embodiment of the valve 3 of FIG. 1 wherein a retaining ring 53 has been substituted for the lock nut 47 of FIG. 1, and the top portion of the valve stem 11 has a groove to contain the retaining ring 53.

Figure 3:
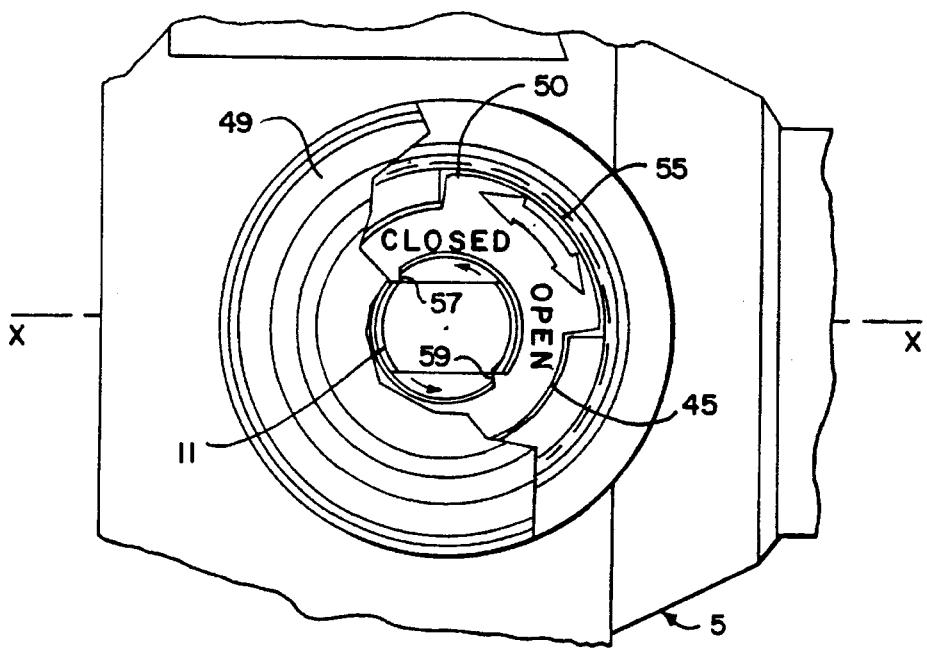
FIG. 3 is a top plan view, partly broken away, taken along line 1—1 of the valves of FIGS. 1 and 2.

Referring now to FIG. 3, the top portion of stem guide 45 is shown therein. A portion of cap 49 and lock nut 47 of FIG. 1 (or retaining ring of FIG. 2) have been omitted. As shown in FIGS. 1 and 3, flange 55 on stem guide 45 fits into a cut-out 50 on the top portion of valve body 5. This prevents the stem guide 45 from rotating as valve stem 11 is rotated. As may be seen in FIG. 3, tabs 57 and 59 on stem guide 45 act to restrict the rotation of valve stem 11 to ninety degrees (90°) of movement between the open and closed positions.

Having described the invention generally in detail in connection with the drawings, including presently preferred embodiments thereof, those skilled in the art will be able to practice the invention either according to the embodiments disclosed or according to other embodiments without departing from the spirit and scope of the appended claims.

What is claimed is:

1. In a ball valve comprising valve body means having a cavity for housing a ball valve member rotatable on its vertical axis, an inlet port, an outlet port and a valve stem receiving passageway axially aligned with said vertical axis, a ball valve member disposed in said cavity having a passageway providing communication between said inlet and outlet ports, and a valve stem disposed within said valve stem receiving passageway and operatively connected at its bottom end with said ball valve member, the improvement comprising, said valve stem receiving passageway having a bottom annular recess and spaced thereabove an upper annular recess, a primary seal washer resistant to fluid passing through said ball valve seated in the upper end of said bottom annular recess and embracing said valve stem, an O-ring seated within the lowest portion of said upper annular recess under radial compression embracing engagement with said valve stem and free of axial compression, annular spring means and an annular gland surrounding said valve stem and disposed in said upper annular recess above said O-ring, and a retainer juxtaposed to the upper one of said annular spring means and said annular gland, said value stem having an annular flange on its lower end which fits into said bottom annular recess with upward engagement with the underside of said primary seal washer and having an upper end protruding above said retainer which can be engaged by tool for rotating said value stem together with said ball value member, said retainer being held down against the upper one of said annular spring means and said gland so that said spring means is maintained under compression thereby maintaining an upward thrust on said value stem whereby said annular flange maintains upward and radial seal-forming engagement with said primary seal washer.

2. The ball valve of claim 1 wherein a backup ring resistant to fluid passing through said ball valve is seated underneath said O-ring within the lowest portion of said upper annular recess under radial compression embracing engagement between said valve stem and said value body means.

3. The ball value of claim 1 wherein said gland is a valve stem guide having inwardly protruding tabs that serve as stops to limit the rotation of said valve stem.

4. The ball valve of claim 1 wherein said retainer is a lock nut having threaded engagement with said valve stem.

5. The ball valve of claim 1 wherein said retainer is a retaining ring.

6. The ball valve of claim 1 wherein said spring means is a spring washer.

7. The ball valve of claim 1 having a cap that acts in threaded engagement with said valve body means to cover the top portion of said valve stem and has a cap seal that acts as a pressure vent by rotatably disengaging from said valve body means prior to thread disengagement of said cap from said valve body means.

* * * * *